(12) United States Patent
Nowozin et al.

(10) Patent No.: US 9,344,690 B2
(45) Date of Patent: May 17, 2016

(54) IMAGE DEMOSAICING

(71) Applicant: Microsoft Corporation, Redmond, WA (US)

(72) Inventors: Reinhard Sebastian Bernhard Nowozin, Cambridge (GB); Danyal Khashabi, Urbana, IL (US); Jeremy Martin Jancsary, Vienna (AT); Bruce Justin Lindbloom, Eden Prairie, MN (US); Andrew William Fitzgibbon, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 14/163,851

(22) Filed: Jan. 24, 2014

(65) Prior Publication Data

US 2015/0215590 A1  Jul. 30, 2015

(51) Int. Cl.
| | | |
|---|---|---|
| *H04N 9/00* | (2006.01) | |
| *H04N 9/04* | (2006.01) | |
| *G06T 3/40* | (2006.01) | |
| *H04N 9/69* | (2006.01) | |

(52) U.S. Cl.
CPC .............. *H04N 9/045* (2013.01); *G06T 3/4015* (2013.01); *H04N 9/69* (2013.01)

(58) Field of Classification Search
CPC ......... G06T 3/4015; H04N 9/045; H04N 9/69
See application file for complete search history.

(56) References Cited

U.S. PATENT DOCUMENTS

| | | |
|---|---|---|
| 3,971,065 A | 7/1976 | Bayer |
| 4,605,956 A | 8/1986 | Cok |
| 4,642,678 A | 2/1987 | Cok |
| 5,373,322 A | 12/1994 | Laroche et al. |
| 5,382,976 A | 1/1995 | Hibbard |
| 5,629,734 A | 5/1997 | Hamilton, Jr. et al. |
| 7,149,262 B1 * | 12/2006 | Nayar .................... G06T 3/4015 375/341 |

(Continued)

FOREIGN PATENT DOCUMENTS

CN          103442159 A   * 12/2013

OTHER PUBLICATIONS

"International Search Report & Written Opinion Received for PCT Patent Application No. PCT/US2015/012330", Mailed Date: Apr. 22, 2015, 13 Pages.

(Continued)

*Primary Examiner* — Jingge Wu
(74) *Attorney, Agent, or Firm* — Tom Wong; Micky Minhas; Zete Law, P.L.L.C.

(57) ABSTRACT

Image demosaicing is described, for example, to enable raw image sensor data, where image elements have intensity values in only one of three color channels, to be converted into a color image where image elements have intensity values in three color channels. In various embodiments a trained machine learning component is used to carry out demosaicing optionally in combination with denoising. In some examples the trained machine learning system comprises a cascade of trained regression tree fields. In some examples the machine learning component has been trained using pairs of mosaiced and demosaiced images where the demosaiced images have been obtained by downscaling natural color digital images. For example, the mosaiced images are obtained from the demosaiced images by subsampling according to one of a variety of color filter array patterns.

20 Claims, 10 Drawing Sheets

(56) References Cited

U.S. PATENT DOCUMENTS

| | | | |
|---|---|---|---|
| 7,158,685 B2 | 1/2007 | Guenter | |
| 8,295,595 B2 | 10/2012 | Matsushita et al. | |
| 8,417,047 B2 | 4/2013 | Chatterjee et al. | |
| 2004/0001641 A1* | 1/2004 | Guenter | G06T 3/4015 382/260 |
| 2004/0086177 A1* | 5/2004 | Zhang | H04N 9/045 382/167 |
| 2008/0152215 A1* | 6/2008 | Horie | G02B 27/2214 382/154 |
| 2009/0027504 A1* | 1/2009 | Lim | H04N 17/002 348/187 |
| 2009/0027523 A1* | 1/2009 | Chang | H04N 9/3147 348/254 |
| 2009/0028465 A1* | 1/2009 | Pan | G06T 3/4007 382/300 |
| 2011/0176730 A1* | 7/2011 | Sasaki | G06T 3/4015 382/167 |
| 2014/0126808 A1* | 5/2014 | Geisler | G06T 5/002 382/159 |
| 2014/0176760 A1* | 6/2014 | Taguchi | G06T 5/002 348/224.1 |

OTHER PUBLICATIONS

Deever, et al., "Digital Camera Image Formation: Processing and Storage", in book Digital Image Forensics, Jul. 31, 2012, pp. 45-77.
Khashabi, et al., "Joint Demosaicing and Denoising via Learned Nonparametric Random Fields", In Proceedings of IEEE Transactions on Image Processing, vol. 23, Issue 12, Dec. 2014, pp. 4968-4981.
Narasimhan, et al., "Enhancing Resolution Along Multiple Imaging Dimensions Using Assorted Pixels", In Proceedings of IEEE Transactions on Pattern Analysis and Machine Intelligence, vol. 27, Issue 4, Apr. 2005, pp. 518-530.
Nowozin, et al., "Pattern-Independent Demosaicing", Published on: Aug. 2013 Available at: http://web.engr.illinois.edu/~khashab2/files/2013_2014_demosaicing/2013_RTF_demosaicing_1.pdf.
Yin, et al., "Demosaicing and Super-Resolution for Color Filter Array via Residual Image Reconstruction and Sparse Representation", Published in International Journal of Computer Science and Business Informatics, vol. 16, No. 1, Oct. 1, 2013, 12 Pages.
He, et al., "A Self-Learning Approach to Color Demosaicking via Support Vector Regression", In Proceeding of the 19th IEEE International Conference on Image Processing, Sep. 30, 2012, 4 pages.
Burger, Harold Christopher, "Modelling and Learning Approaches to Image Denoising", Published on: May 8, 2013, Available at: http://www.hcburger.com/files/thesis.pdf.
Paliya, et al., "Denoising and Interpolation of Noisy Bayer Data with Adaptive Cross-Color Filters", In Proceeding of the Visual Communications and Image Processing, Jan. 28, 2008, 13 pages.
Ramanath, et al., "Adaptive Demosaicking", In Journal of Electronic Imaging, vol. 12, Issue 4, Oct. 2003, 10 pages.
Siddiqui, et al., "Training-Based Demosaicing", In IEEE International Conference on Acoustics Speech and Signal Processing, Mar. 14, 2010, 4 pages.
Kapah, et al., "Demosaicing using Artificial Neural Networks", In Electronic Imaging—International Society for Optics and Photonics, Apr. 2000, 9 pages.
Oaknin, Jacob H., "A Statistical Learning Approach to Color Demosaicing", In arXiv Preprint, arXiv:0905.2958, Feb. 12, 2010, 24 pages.
Jancsary, et al., "Regression Tree Fields—An Efficient, Non-Parametric Approach to Image Labeling Problems", In IEEE Conference on Computer Vision and Pattern Recognition, Jun. 16, 2012, 8 pages.
Jancsary, et al., "Loss-Specific Training of Non-Parametric Image Restoration Models: A New State of the Art", In Proceedings of the 12th European Conference on Computer Vision, Oct. 7, 2012, 14 pages.
Paliy, et al., "Spatially Adaptive Color Filter Array Interpolation for Noiseless and Noisy Data", In International Journal of Imaging Systems and Technology, vol. 17, Issue 3, Oct. 2007, 18 pages.
Gunturk, et al., "Color Plane Interpolation Using Alternating Projections", In IEEE Transactions on Image Processing, vol. 11, Issue 9, Sep. 2002, 17 pages.
Foi, et al., "Practical Poissonian-Gaussian Noise Modeling and Fitting for Single-Image Raw-Data", In IEEE Transactions on Image Processing, vol. 17, Issue 10, Oct. 2008, 18 pages.
Takamatsu, et al., "Estimating Demosaicing Algorithms Using Image Noise Variance", In 23 IEEE Conference on Computer Vision and Pattern Recognition, Jun. 13, 2010, 8 pages.
Li, et al., "Color Filter Arrays: Representation and Analysis", In Technical Report Series—RR-08-04, 2008, May 2008, 20 pages.
Wang, et al., "New Color Filter Arrays of High Light Sensitivity and High Demosaicking Performance", In 18th IEEE International Conference on Image Processing, Sep. 11, 2011, 4 pages.
Hirakawa, et al., "Adaptive Homogeneity-Directed Demosaicing Algorithm", In IEEE Transactions on Image Processing, vol. 14, Issue 3, Mar. 2005, 4 pages.
Menon, et al., "Demosaicing with Directional Filtering and a Posteriori Decision", In IEEE Transactions on Image Processing, vol. 16, Issue 1, Jan. 2007, 10 pages.
Zhang, et al., "Color Demosaicking via Directional Linear Minimum Mean Square-Error Estimation", In IEEE Transactions on Image Processing, vol. 14, Issue 12, Dec. 2005, 12 pages.
Lukac, et al., "Color Image Zooming on the Bayer Pattern", In IEEE Transactions on Circuits and Systems for Video Technology, vol. 15, Issue 11, Nov. 2005, 18 pages.
Kimmel, Ron, "Demosaicing: Image Reconstruction from Color CCD Samples", In IEEE Transactions on Image Processing, vol. 8, Issue 9, Sep. 1999, 8 pages.
Taubman, David, "Generalized Wiener Reconstruction of Images from Colour Sensor Data Using a Scale Invariant Prior", In International Conference on Image Processing, vol. 3, Sep. 10, 2000, 4 pages.
Lu, et al., "Demosaicking by Alternating Projections: Theory and Fast One-Step Implementation", In IEEE Transactions on Image Processing, vol. 19, Issue 8, Aug. 2010, 13 pages.
Alleysson, et al., "Linear Demosaicing Inspired by the Human Visual System", In IEEE Transactions on Image Processing, vol. 14, Issue 4, Apr. 2005, 12 pages.
Dubois, Eric, "Frequency-Domain Methods for Demosaicking of Bayer-Sampled Color Images", In IEEE Signal Processing Letters, vol. 12, Issue 12, Dec. 2005, 4 pages.
Dubois, E., "Filter Design for Adaptive Frequency-Domain Bayer Demosaicking", In IEEE International Conference on Image Processing, Oct. 8, 2006, 4 pages.
Moghadam, et al., "Compressive Framework for Demosaicing of Natural Images", In IEEE Transactions on Image Processing, vol. 22, Issue 6, Jun. 2013, 16 pages.
Moghadam, et al., "Compressive Demosaicing", In IEEE International Workshop on Multimedia Signal Processing, Oct. 4, 2010, 6 pages.
Aghagolzadeh, et al., "Bayer and Panchromatic Color Filter Array Demosaicing by Sparse Recovery", In Proceedings of the International Society for Optics and Photonics, Jan. 24, 2011, 11 pages.
Su, Chung-Yen, "Highly Effective Iterative Demosaicing Using Weighted-Edge and Color-Difference Interpolations", In IEEE Transactions on Consumer Electronics, vol. 52, Issue 2, Sep. 2006, 7 pages.
Zhang, et al., "Color Demosaicking by Local Directional Interpolation and Nonlocal Adaptive Thresholding", In Journal of Electronic Imaging, vol. 20, No. 2, Apr. 2011, pp. 29.
Milanfar, Peyman, "A Tour of Modern Image Filtering", In Proceedings of IEEE Signal Processing Magazine, vol. 30, Issue 1, Jan. 2013, 23 pages.
Getreuer, Pascal, "Color Demosaicing with Contour Stencils", In Proceedings of 17th International Conference on Digital Signal Processing, Jul. 6, 2011, 6 pages.
Chatterjee, et al., "Is Denoising Dead?", In IEEE Transactions on Image Processing, vol. 19, Issue 4, Apr. 2010, 17 pages.
Zhang, et al., "Color Reproduction from Noisy CFA Data of Single Sensor Digital Cameras", In IEEE Transactions on Image Processing, vol. 16, Issue 9, Sep. 2007, 14 pages.

(56) References Cited

OTHER PUBLICATIONS

Hirakawa, et al., "Joint Demosaicing and Denoising", In IEEE International Conference on Image Processing, vol. 15, Issue 8, Aug. 2006, 12 pages.

Leung, et al., "Least-Squares Luma—Chroma Demultiplexing Algorithm for Bayer Demosaicking", In IEEE Transactions on Image Processing, vol. 20, Issue 7, Jul. 2011, 10 pages.

Condat, et al., "Joint Demosaicking and Denoising by Total Variation Minimization", In 19th IEEE International Conference on Image Processing, Sep. 30, 2012, 4 pages.

Danielyan, et al., "Cross-Color BM3D Filtering of Noisy Raw Data", In Proceedings of International Workshop on Local and Non-Local Approximation in Image Processing, Aug. 19, 2009, 5 pages.

Menon, et al., "Joint Demosaicking and Denoising with Space-Varying Filters", In 16th IEEE International Conference on Image Processing, Nov. 7, 2009, 4 pages.

Park, et al., "A Case for Denoising Before Demosaicking Color Filter Array Data", In Proceedings of the Conference Record of the Forty-Third Asilomar Conference on Signals, Systems and Computers, Nov. 1, 2009, 5 pages.

Chatterjee, et al., "Noise Suppression in Low-Light Images through Joint Denoising and Demosaicing", In Proceedings of the IEEE Conference on Computer Vision and Pattern Recognition, Jun. 20, 2011, 8 pages.

Zhang, et al., "PCA-Based Spatially Adaptive Denoising of CFA Images for Single-Sensor Digital Cameras", In IEEE Transactions on Image Processing, vol. 18, Issue 4, Apr. 2009, 16 pages.

Hirakawa, et al., "Image Denoising for Signal-Dependent Noise", In Proceedings of IEEE International Conference on Acoustics, Speech, and Signal Processing, vol. 2, Mar. 18, 2005, 4 pages.

Condat, Laurent, "A Simple, Fast and Efficient Approach to Denoisaicking: Joint Demosaicking and Denoising", In Proceedings of 17th IEEE International Conference on Image Processing, Sep. 26, 2010, 4 pages.

Jeon, et al., "Demosaicking of Noisy Bayer Sampled Color Images with Least-Squares Luma-Chroma Demultiplexing and Noise Level Estimation", In IEEE Transactions on Image Processing, vol. 22, Issue 1, Jan. 2013, 11 pages.

Zoran, et al., "Scale Invariance and Noise in Natural Images", In Proceedings of 12th International Conference on Computer Vision, Sep. 29, 2009, 8 pages.

Kim, et al., "A New In-Camera Imaging Model for Color Computer Vision and its Application", In IEEE Transactions on Pattern Analysis and Machine Intelligence, vol. 34, Issue 12, Dec. 2012, 14 pages.

Wang, et al., "Image Quality Assessment: From Error Visibility to Structural Similarity", In IEEE Transactions on Image Processing, vol. 13, Issue 4, Apr. 2004, 14 pages.

"Second Written Opinion Issued in PCT Application No. PCT/US2015/012330", Mailed Date: Jan. 19, 2016, 10 pages.

* cited by examiner

IMAGE DEMOSAICING

BACKGROUND

Image demosaicing is an image processing stage used for images captured by existing digital color cameras which use imaging sensors with color filter arrays. In these types of cameras (generally speaking most of the currently available digital color cameras) the semiconductor imaging sensor is a greyscale sensor that is not capable of detecting different colors. To enable color images to be captured, a color filter array is placed over the semiconductor imaging sensor. The color filter array is a grid of color filters arranged in a tessellating pattern so that each sensor element (sensel) of the imaging sensor receives light in a color range according to the filter array cell color positioned over the sensel. In this way a mosaic image is captured where image elements have single intensity values for one of three or more color channels (red, green and blue for example). Demosaicing is a process whereby intensity values for the other two channels are calculated for each of the image elements.

Many different existing image demosaicing processes exist. These may be tailored for example, according to whether the output color images are destined for a particular type of display screen or printing device.

Existing image demosaicing processes are limited in terms of accuracy and quality of results they produce. Artifacts are often introduced by existing image demosaicing processes. There is also a desire to achieve image demosaicing with minimal computing and memory resources and in short time scales. For example, many color cameras are implemented in resource constrained devices such as smart phones, where limited processing and memory resources are under high demand.

The embodiments described below are not limited to implementations which solve any or all of the disadvantages of known image demosaicing equipment.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Image demosaicing is described, for example, to enable raw image sensor data, where image elements have intensity values in only one of three color channels, to be converted into a demosaiced image where image elements have intensity values in three color channels. In various embodiments a trained machine learning component is used to carry out demosaicing optionally in combination with denoising. In some examples the trained machine learning system comprises a cascade of trained regression tree fields. In some examples the machine learning component has been trained using pairs of mosaiced and demosaiced images where the demosaiced images have been obtained by downscaling natural color digital images. For example, the mosaiced images are obtained from the demosaiced images by subsampling according to one of a variety of color filter array patterns.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image demosaicing system for still digital images, the system described is provided as an example and not a limitation. As those skilled in the art will appreciate, the present examples are suitable for application in a variety of different types of color imaging systems including those where streams of color images are captured, such as color video cameras.

Figure 1:
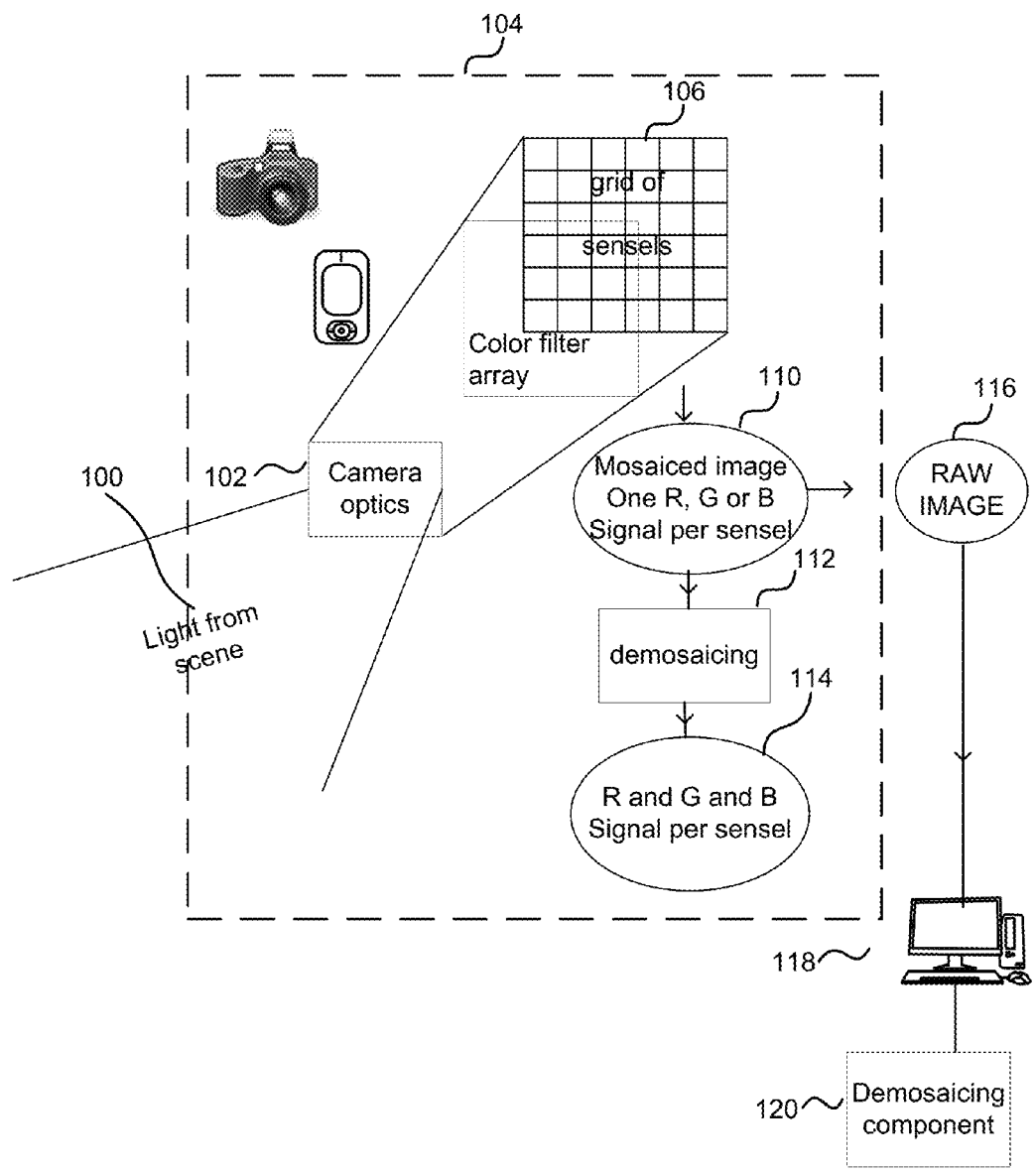
FIG. 1 is a schematic diagram of part of a digital color camera with a demosaicing component.

FIG. 1 is a schematic diagram of part of a digital color camera 104 with a demosaicing component 112. Only some of the components of the camera 104 are illustrated for clarity. The camera has camera optics 102 comprising one or more lenses or other optics for focusing light from a scene 100 onto an image sensor such as a grid of semiconductor sensels 106. A color filter array 108 is positioned in front of the grid of sensels such that each sensel (sensor element) produces a signal in one of three primary color channels (red, green and blue for example). The signals are digitized to give mosaiced image 110.

The mosaiced image 110 may be input to a demosaicing component 112 which calculates missing color channel values so that image elements of an output demosaiced image have separate intensity values for three primary color channels. The demosaicing component may be computer implemented using software and/or hardware. In some examples the demosaicing component is implemented, in whole or in part, using one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units (GPUs) or other.

In the example of FIG. 1 the demosaicing component 112 is shown as part of the camera 104. However, this is not essential. The demosaicing component may be at a personal computer 118 or other computing device. For example, the mosaiced image may be output as a RAW image 111 for example, in a RAW file. The RAW file may be input to a personal computer 118 or other computing device which has a demosaicing component 120 the same as the demosaicing component 112. The RAW IMAGE 111 may be transferred to the personal computer or other computing device in any suitable manner, such as over a communications network.

Figure 2:
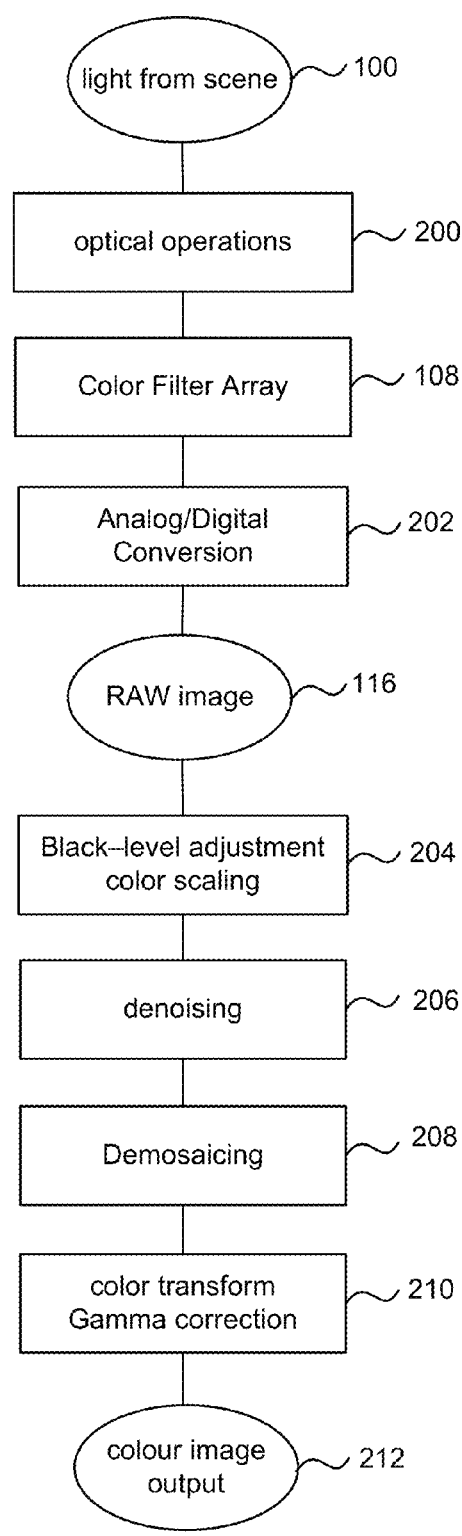
FIG. 2 is a flow diagram of an image processing pipeline to produce a color image.

FIG. 2 is a flow diagram of an image processing pipeline to produce a color image. This image processing pipeline may be computer implemented using software and/or hardware. For example, the pipeline is implemented, in whole or in part, at a digital color camera such as camera 104 of FIG. 1. This pipeline illustrates how a demosaicing process may be used as part of a process of calculating a color image 212 for rendering and/or printing. The pipeline illustrates how various examples described herein use demosaicing in a linear light-space of such a pipeline as opposed to a color image space (e.g. sRGB space) as in previous systems. By carrying out demosaicing in the linear light-space improved quality results are obtained. The term "linear light-space" is used to refer to a stage of a color image processing pipeline at which a digital mosaiced image has been linear color-scaled and black-level adjusted but at which a color transform and Gamma correction have not been applied to the digital mosaiced image. A linear light-space is therefore a stage of a color image processing pipeline at which a digital mosaiced image has only undergone linear adjustments.

Light from a scene 100 undergoes optical operations 200 as it passes through camera optics and is also filtered by color filter array 108 before hitting an imaging sensor at the camera. The imaging sensor produces an analog signal which undergoes analog to digital conversion 202 resulting in a RAW image 116 which may be stored and/or output. The RAW image is processed for black-level adjustment and linear color scaling 204 using any suitable black-level adjustment and linear color scaling process. The image may then be denoised 206, for example, by denoising each of the color channels separately. Any suitable denoising process may be used. The linear scaled, denoised, RAW image is then demosaiced 208 using a trained machine learning component as described in more detail below. The demosaiced image is processed with a color transform and Gamma correction 210 resulting in a color image output 212 for rendering and/or printing.

Figure 3:
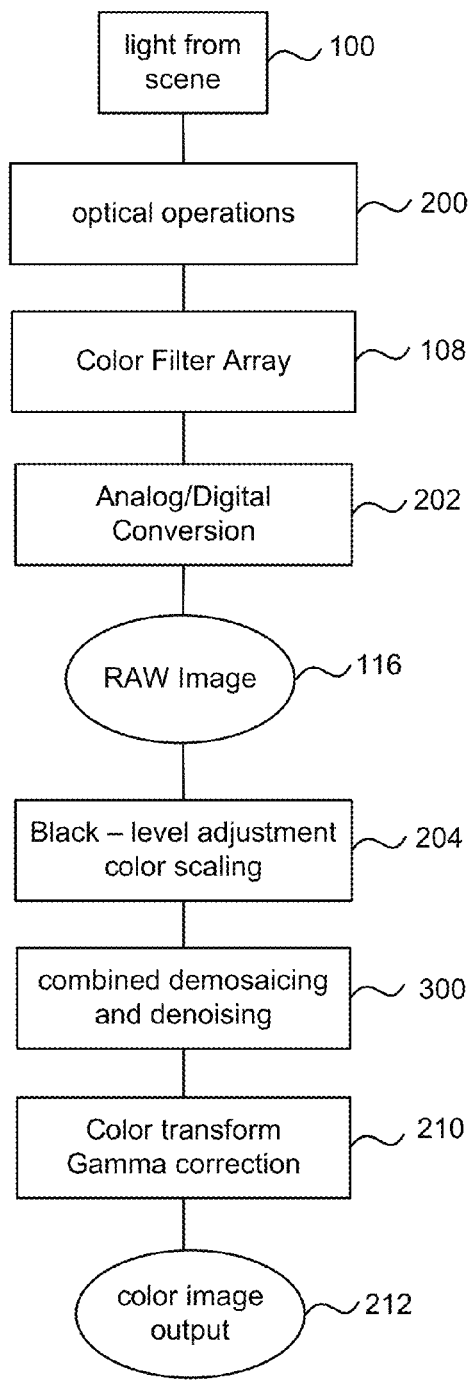
FIG. 3 is a flow diagram of another image processing pipeline to produce a color image.

In some examples described herein, a combined denoising and demosaicing component is used. This is illustrated in FIG. 3 which is a flow diagram of another image processing pipeline to produce a color image. The pipeline is the same as that of FIG. 2 except that the denoising and demosaicing components are integral in a combined demosaicing and denoising component 300.

Figure 4:
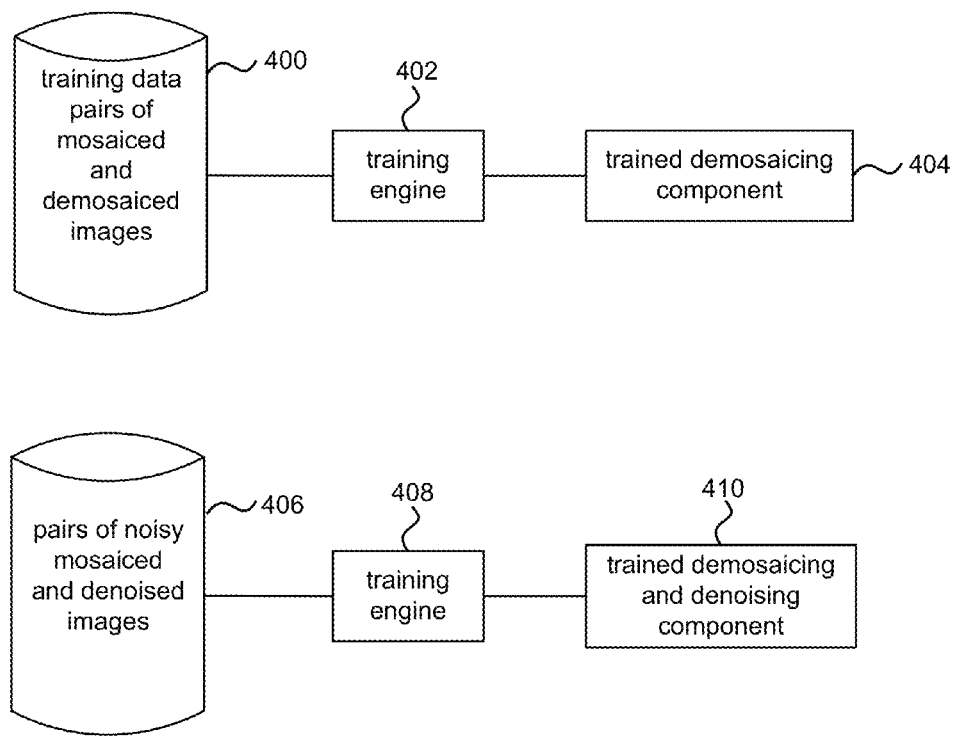
FIG. 4 is a schematic diagram of a training engine for training a demosaicing component.

As mentioned above the demosaicing component 208 and the combined demosaicing and denoising component 300 may be implemented using training machine learning components. With reference to FIG. 4 training data 400 comprising pairs of mosaiced and demosaiced images may be used by a training engine 402 to produce a trained demosaicing component 404. In another example, pairs of noisy mosaiced and denoised, demosaiced images 406 may be used by training engine 408 to produce a trained demosaicing and denoising component 410. However, it is not straightforward to obtain suitable training data. This is because ground truth demosaiced images cannot be obtained directly from cameras which use color filter arrays. To obtain demosaiced images from RAW images some processing is carried out and this introduced errors and artifacts. As a result the calculated demosaiced images are not empirically observed ground truth demosaiced images. For example, some approaches have used linear interpolation to calculate missing color channel values and so compute a demosaiced image from a mosaiced image. Machine learning systems which use these types of calculated demosaiced images may be poor quality because they learn from demosaiced images which have artifacts and errors. In various examples described herein a new way of creating training data is described which uses a general downsampling method which works for arbitrary color filter arrays and arbitrary downscaling sizes. In some examples realistic image noise for the downsampled images is simulated.

The training process at the training engine typically uses an update procedure and a training objective also referred to as a loss function. More detail about example training processes is given later in this document. The trained component 404, 410 may comprise any suitable machine learning component such as a neural network, support vector machine, a linear regression model, a regression tree field, cascade of machine learning components. An example in which the trained component 404, 410 comprises a cascade of regression tree fields is now given with reference to FIG. 5. For example, the demosaicing component 208 of FIG. 2 may comprise the cascade of regression tree fields of FIG. 5. For example, the demosaicing and denoising component 300 of FIG. 3 may comprise the cascade of regression tree fields of FIG. 5.

A regression tree field (RTF) is a plurality of regression trees used to represent a conditional random field. A conditional random field (CRF) is a statistical model for predicting a label of an image element by taking into account other image elements in the image. A Gaussian conditional random field comprises unary potentials and pair-wise potentials. In an RTF one or more regression trees may be associated with unary potentials of a conditional random field and one or more regression trees may be associated with pairwise potentials of a conditional random field. Unary potentials are related to individual image elements. Pair-wise potentials are related to pairs of image elements. Each leaf of the regression tree may store an individual linear regressor that determines a local potential.

A regression tree comprises a root node connected to a plurality of leaf nodes via one or more layers of split nodes. Image elements of an image may be pushed through a regression tree from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. During training, image statistics (also referred to as features) are chosen for use at the split nodes and parameters are stored at the leaf nodes. These parameters are then chosen so as to optimize the quality of the predictions (as measured by a loss function) on the training set. After training, image elements and/or features of an input mosaiced image are pushed through the regression trees to find values of the parameters.

Figure 5:
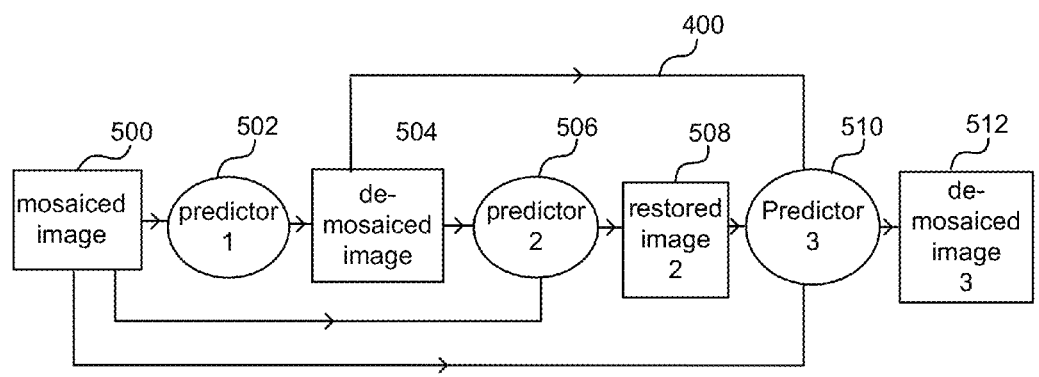
FIG. 5 is a schematic diagram of a cascade of regression tree fields arranged to form a demosaicing component.

FIG. 5 is a schematic diagram of a cascade of trained machine learning predictors 502, 506, 510 such as regression tree fields. In this example each layer of the cascade comprises a single machine learning predictor which produces a demosaiced image (504, 508, 512) as output. That is, each machine learning predictor 502, 506, 510 is a layer of the cascade. The machine learning predictors may carry out demosaicing or demosaicing combined with denoising. The predictors 502, 506, 510 are connected in series. Three cascade layers are shown in this example. However the number of cascade layers may be different. There can be two or more cascade layers depending on the particular task involved and the computational resources available.

Predictor 2 506 and predictor 3 510 may be referred to as internal layers. A predictor in an internal layer receives input which is the output of the previous layer. For example, predictor 2 506 receives input which is restored image 1 504 output by predictor 1 502. The initial layer comprises predictor 1 which receives input from the mosaiced image 500 as do the other layers. That is, each layer receives the mosaiced image 300 as input.

In some examples a predictor in an internal layer may also receive input from earlier layers, which are not the immediately previous layer. This is illustrated in FIG. 5 which shows demosaiced image 1 504 being used as input to predictor 3 510. It is also possible for features computed from demosaiced image 1 504 to be used as input to predictor 3 510 (this is not shown in FIG. 5 for clarity).

In the examples in FIG. 5 each cascade layer comprises a single predictor. However, it is also possible to use two or more predictors at each cascade layer. These predictors may be independent.

A mosaiced image 500 such as the mosaiced image in the linear light-space of FIGS. 2 and 3 may be input to the cascade to compute the series of demosaiced images. In some examples the processing through the cascade may be stopped according to user input, for example, where user input indicates that a color image displayed on the basis of one of the demosaiced images is of an acceptable quality.

The machine learning predictors of FIG. 5 may be trained using training data created using a process as described with reference to FIG. 6 or with training data obtained in any other suitable manner. During training a loss function is used to enable updates to be made to the predictors in the light of the training data examples. The loss function expresses a quality of demosaicing between input and output images and may be directly optimized during training. For example the loss function may comprise peak signal to noise ratio (PSNR), mean squared error (MSE), mean absolute deviation (MAD), or structural image similarity (SSIM). These are examples; other types of loss function may be used which express a quality of demosaicing between input and output images of a predictor. The loss function may be specified by a user, or may be preconfigured.

In the demosaicing examples described herein using regression tree fields the demosaicing problem may be expressed using a conditional random field as follows:

$$p(y|x;\Theta) \propto \exp\{-E(y|x;\Theta)\}$$

Which may be expressed in words as, the probability of a demosaiced image y given a mosaiced image x which has local and pair-wise potentials (given in a matrix $\Theta$) of a conditional random field, is proportional to the exponent of the negative of an energy function E of the demosaiced image y given the mosaiced image x and its potentials $\Theta$.

Given a set V of pixel locations, and given the input variables x, one per element of V it is desired to infer the labeling of the output variables y, one per element of V. For an image, assume that V is arranged according to the grid layout of an image. To make training the model and inference simpler, limit to a set of local factors which are indexed by F. These factors may consist of different configurations like one variable, pair-wise variables, etc. Call each of these configurations "types" inside which the factors have the same structure, and denote the set of factors with the same type with $\mathcal{F}_t = \{F | \text{type }(F) = t\}$. Denote the set of output variables $y_F$ upon which the factor F is acting, and the energy function can be factorized over the factors, to a local energy of the factor variables by the quadratic energy function:

$$E_t(y_F | x_F; \Theta_t) = \frac{1}{2} y_F^T Q(x_F; \Theta_t) y_F - y_F^T L_t(x_F; \Theta_t) b_t(x_F)$$

in which define $b_t(x_F) \in \mathbb{R}^{B_t}$ as the set of linear basis vectors as a function of factor type t. Now the total energy over the graph may be found by summing over factors as follows:

$$E_t(y_F|x_F;\Theta) = \Sigma_t \Sigma_{F_t} \mathcal{F} E_t(y_F|x_F;\Theta_t). \quad \text{referred to as equation 1.}$$

Assume that for each type t a regression tree is defined, taking as input the adjacent set of inputs $x_F$ and assigning to them a leaf index in the tree. Hence instead of having the parameters for each of the factors defined over each pixel, the process only saves parameters at the leaves of each tree.

Given the parameters of potentials, the minimizer to the overall potential function in Equation 1 can uniquely be found by, $$\mu = [Q(x_F;\Theta_t)]^{-1} L_t(x_F;\Theta_t) b_t(x_F)$$

The regression tree fields may be trained discriminatively with respect to a given loss function. Thus by designing more sensible loss functions it is possible to improve the quality of the model.

There are few important facts that may be exploited in a successful demosaicing algorithm. For example, the strong correlation between the color channels. This means that the variation of intensities in each channel covary in a very similar way. In the examples described herein using regression tree fields, this correlation is taken into account by the joint quadratic-exponent energy minimization between pixels of different channels.

In some examples, a cost function used during training may be generalized to take into account a camera response function. This facilitates a demosaicing system which is better able to create images which are appealing to human eye at the end of image pipeline after demosaicing and the nonlinear image transformations done inside the camera, after demosaicing.

A camera response function may be defined as, $$f: L \to I$$

in which L is the "linear-space image" which is mapped to I, i.e. the sRGB space (color image space), or some other suitable perceptual color space.

In some examples, peak signal to noise ratio (PSNR) is used for the loss function during training, and this loss function is generalized to take into account a camera response function of the form given above. This is achieved, for instance, by evaluating the loss function on the output of the camera response function.

Figure 6:
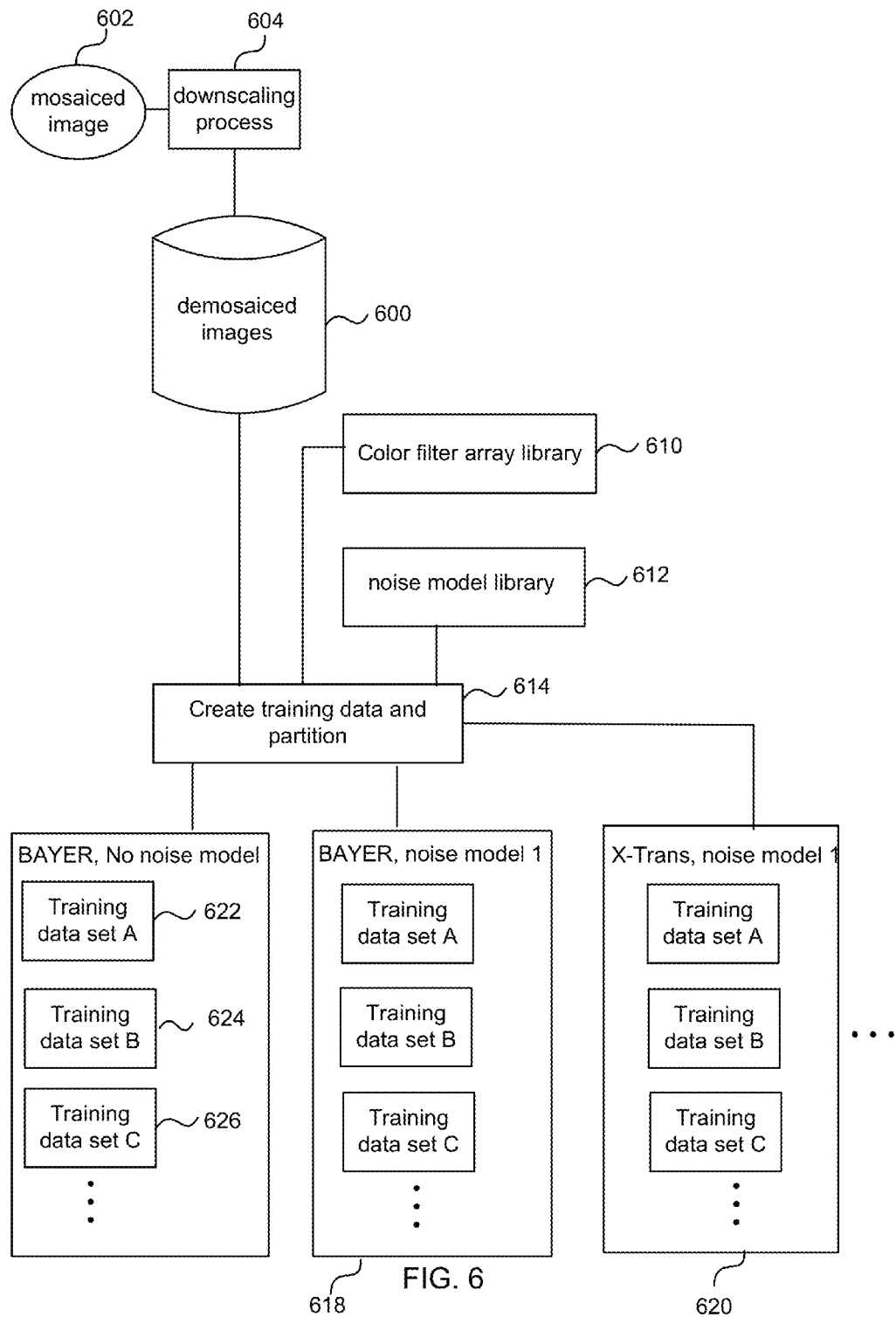
FIG. 6 is a schematic diagram of a system for creating and partitioning training data for training demosaicing components.

FIG. 6 is a schematic diagram of a system for creating and partitioning training data for training demosaicing components. Ground truth demosaiced images 600 (which have three primary color channel values per image element) are calculated and stored at store 600. In some examples the demosaiced images 600 are calculated from linear light-space mosaiced images of natural scenes using a downscaling process 604. In various examples the downscaling process is arranged to work for arbitrary color filter arrays and arbitrary downscaling sizes as described in more detail with reference to FIG. 7. The demosaiced images 600 may be obtained in other ways.

A computer-implemented component 614 accesses the demosaiced images 600 and uses them to create and partition training data. The component 614 may access one or more color filter array patterns from a color filter array library 610. The component 614 may access a noise model from a noise model library 612.

Given a demosaiced image that the component 614 has accessed from the store 600 the component subsamples the demosaiced image according to a color filter array pattern selected from the color filter array library 610. This produces a mosaiced image corresponding to the demosaiced image. The mosaic image and the demosaiced image are a training image pair. Many such training image pairs are calculated and divided into a plurality of training data sets 622, 624, 626. Different ones of the training data sets may be used to train different machine learning predictors in a cascade of machine learning predictors. In the example of FIG. 6 a Bayer pattern is selected from the color filter array library 610 and used to form training data sets 616 without any noise model being taken into account. This training data 616 may be used to train a cascade of machine learning predictors such as those of FIG. 5 to form a demosaicing component such as that of FIG. 2.

In a second example, a Bayer pattern is again selected from the color filter array library 610 and used to form training data sets 618. This time noise is added to the mosaiced images using a noise model selected from noise model library 612. This training data 616 may be used to train a cascade of machine learning predictors such as those of FIG. 5 to form a combined demosaicing and denoising component such as that of FIG. 3.

In a third example, an X-Trans pattern is selected from the color filter array library 610 and used to form training data sets 620. Noise is added to the mosaiced images using a noise model selected from noise model library 612. This training data 620 may be used to train a cascade of machine learning predictors such as those of FIG. 5 to form a combined demosaicing and denoising component such as that of FIG. 3.

Figure 7:
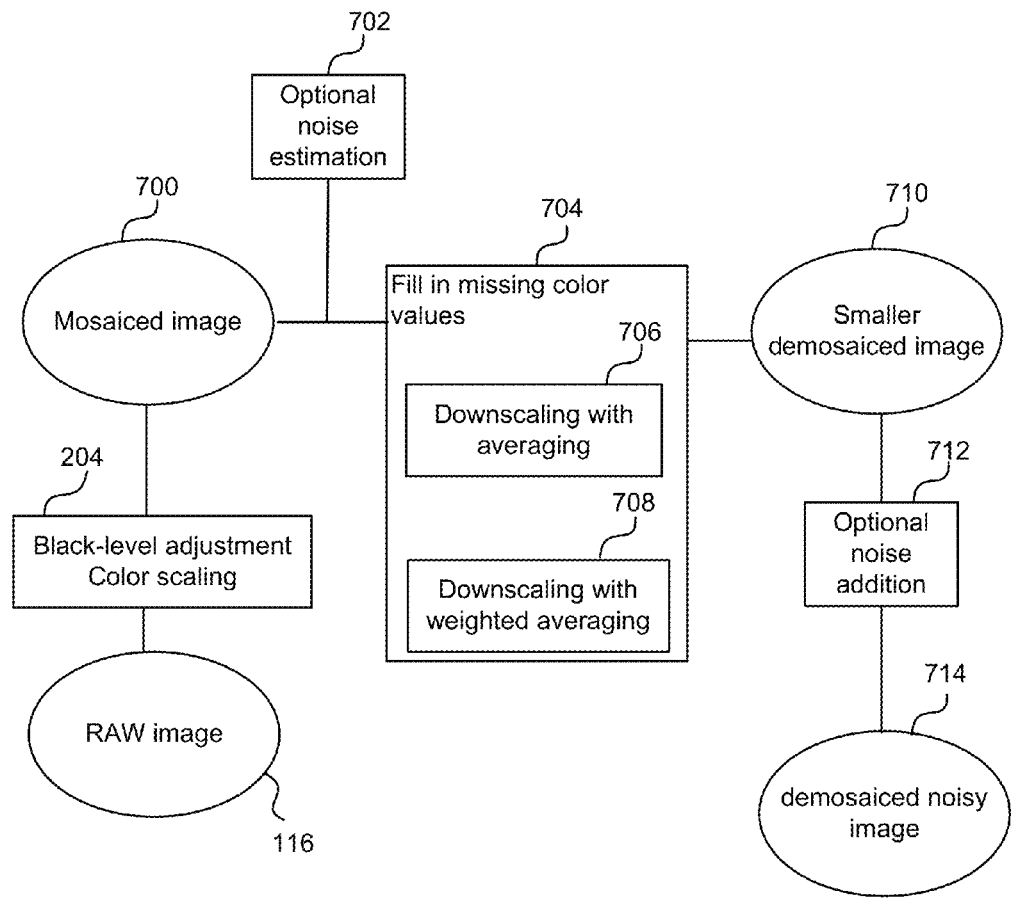
FIG. 7 is a schematic diagram of part of the method of FIG. 6 in more detail.

More detail about the downscaling process 604 is now given with reference to FIG. 7. A RAW mosaiced image 116 from a camera with a color filter array is received and processed using black-level adjustment and linear color scaling 204. This image is a mosaiced image 700 in a linear light-space as described above. The image is input to a downscaling process 704 to fill in the missing color values.

The output of the downscaling process is a smaller demosaiced image 710. Because of the scale invariance of natural images the fact that the demosaiced image is smaller than the mosaiced image 700 does not matter. The smaller demosaiced image may be added to store 600 of FIG. 6. In some examples noise is added using optional noise addition component 712. This allows for the fact that the downscaling process of component 704 removes noise.

The optional noise addition component 712 may use input from a noise estimation component 702 which estimates an amount of noise in the mosaiced image 700.

In some examples the downscaling process 704 comprises a downscaling with averaging process 706. For example, the image 700 is divided into same sized, square blocks of image elements. The red channel signals in a block are averaged to give a single red channel signal. This is also done for the blue and green channels. A downscaled image is created by replacing a block by a single image element taking the averaged signals for the three color channels. The averages may be weighted. Other types of aggregation may be used in place of averaging. Because of the order of the colors in the color filter array pattern artifacts may be introduced in the downscaled image. Also, the size of the averaging blocks (and whether these have an odd or even number of image elements as a side length) impacts the quality of the results.

In some examples the downscaling process uses a weighted averaging 708 where the weighted averaging is designed to give high quality results no matter what the color filter array pattern and/or block size. In some examples image elements are weights according to their spatial position within a block. For example, this is achieved by selecting weights so that the weighted average of the x coordinates in the block corresponds to the center of the block; and the weighted average of the y coordinates in the block corresponds to the center of the block. For example, the weights are found by solving a maximum entropy problem and where the weights in a block sum to 1, are non-negative, and have an average along a row of the center of the block, and an average along a column of the center of the block.

For example, consider a block of size 2W×2W. To compensate for the effect of a shift inside each color channel potentially introduced by downscaling, the process seeks to align the center of mass of each color channel, at the center of the block, (e.g. at coordinates 2.5, 2.5 where the block is a four by four image element block). In addition, a distribution of weights which satisfies constraints is sought, i.e. is a valid distribution, and at the same time increase the entropy of the distribution (maximum uncertainty/entropy principle) as it gives the least informative distribution. The problem can be represented as a constrained convex optimization as follows. Note that the weights are non-zero where the values of the samples in the corresponding channels are non-zero, as an implicit constraint.

$$\begin{cases} \max_p \{\mathcal{H}(p) = -\sum_{x,y} p(x,y) \log p(x,y)\} \\ \sum_{x,y} p(x,y) = 1 \\ p(x,y) \geq 0, \forall x, y \\ \sum_{x,y} x p(x,y) = 2.5, \forall y \\ \sum_{x,y} y p(x,y) = 2.5, \forall x \end{cases}$$

Which may be expressed in words as a maximum entropy of a function p equals the negative of a sum of the function applied to each weight in the block times the log of the function applied to the weights; subject to a list of constraints which are that the weights sum to 1, the weights are non-negative, the sum of the weights in a row is 2.5 and the sum of the weights in a column is 2.5 (where the block has 4 image elements per row and column).

In general the center point of a block of size 2W×2W is (W+0.5, W+0.5) so that weights may be selected by solving the following constrained convex optimization:

$$\begin{cases} \max_p \{\mathcal{H}(p) = -\sum_{x,y} p(x,y)\log p(x,y)\} \\ \sum_{x,y} p(x,y) = 1 \\ p(x,y) \geq 0, \forall x, y \\ \sum_{x,y} xp(x,y) = W + 0.5, \forall y \\ \sum_{x,y} yp(x,y) = W + 0.5, \forall x \end{cases}$$

Which may be expressed in words as a maximum entropy of a function p equals the negative of a sum of the function applied to each weight in the block times the log of the function applied to the weights; subject to a list of constraints which are that the weights sum to 1, the weights are non-negative, the sum of the weights in a row is an x coordinate of the center of the block and the sum of the weights in a column is a y coordinate of the center of the block.

Figure 8:
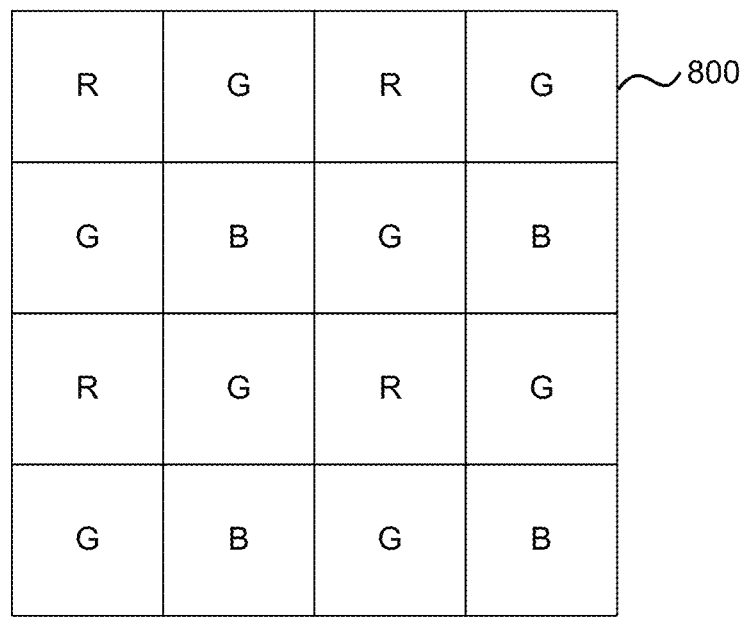
FIG. 8 is an example of a color filter array pattern.

The above formulation can be solved for each channel separately, and the values of p(x; y) is zero wherever there is no sample in that channel. As an example solving the problem for the Bayer pattern block 800 in FIG. 8. for each channel gives the following weights, $$p_r(x,y) = \frac{1}{16}\begin{bmatrix} 1 & 0 & 3 & 0 \\ 0 & 0 & 0 & 0 \\ 3 & 0 & 9 & 0 \\ 0 & 0 & 0 & 0 \end{bmatrix},$$

$$p_b(x,y) = \frac{1}{16}\begin{bmatrix} 0 & 0 & 0 & 0 \\ 0 & 9 & 0 & 3 \\ 0 & 0 & 0 & 0 \\ 0 & 3 & 0 & 1 \end{bmatrix},$$

$$p_g(x,y) = \frac{1}{8}\begin{bmatrix} 0 & 1 & 0 & 1 \\ 1 & 0 & 1 & 0 \\ 0 & 1 & 0 & 1 \\ 1 & 0 & 1 & 0 \end{bmatrix}$$

Figure 9:
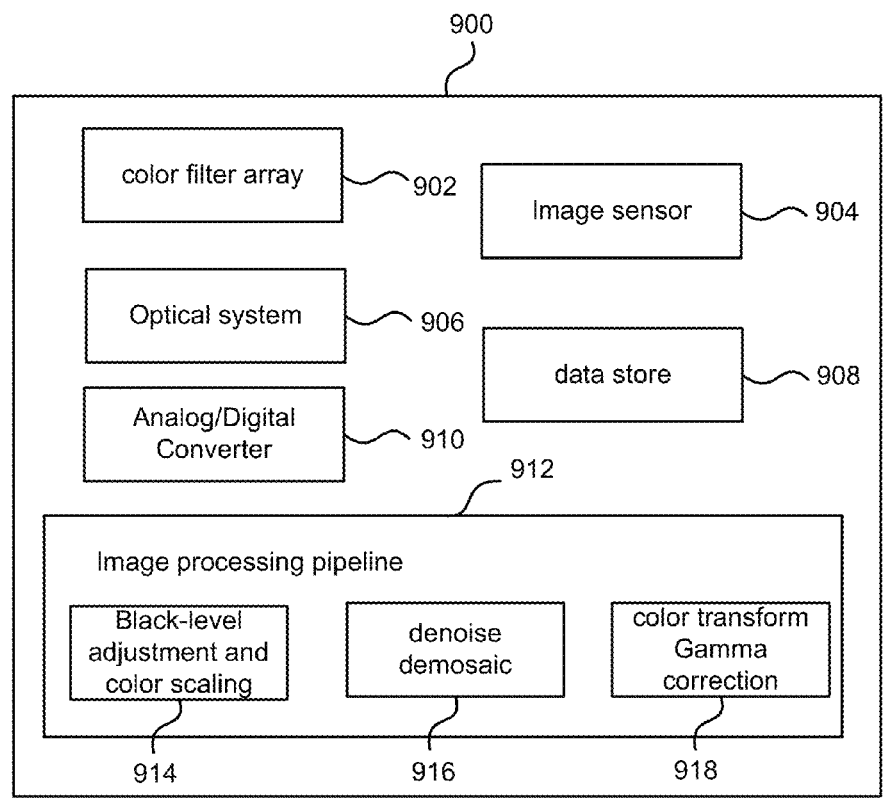
FIG. 9 is a schematic diagram of a color camera.

FIG. 9 is a schematic diagram of a digital color camera 900 comprising a color filter array 902 arranged in conjunction with an image sensor 904.

The image sensor 904 receives ambient light and light reflected from objects within a scene. The image sensor 904 may comprise a CCD sensor, a CMOS sensor, for example a Photonic Mixer Device (PMD) sensor or other appropriate sensor which may be arranged to detect light reflected from surfaces of objects, people or other entities within the camera range.

The camera may further comprise an optical system 906 that is arranged to gather and focus light from the environment on to the image sensor 904. The camera may also comprise an analog to digital converter 910 to digitize signals received at image sensor 904. A data store 908 at the camera may store images and other data.

In one example the camera may comprise image processing pipeline logic 912. In an embodiment image processing pipeline logic may be arranged to execute the methods described herein with reference to one or more of FIGS. 2 to 7. In an example, the described method of training the demosaicing component may be executed as a one-time process during camera testing and calibration.

Image processing pipeline logic may further comprise integrated black-level adjustment and color scaling logic 914, denoising and demosaicing logic 916 and color transform and Gamma correction logic 918 stored at a memory.

In other examples, all or part of the image processing pipeline logic 912 may be located external to the camera on another device e.g. a game system, personal computer, mobile device or other computing device.

Alternatively, or in addition, the functionality of one or more of the components of the image processing pipeline logic 912 may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 10:
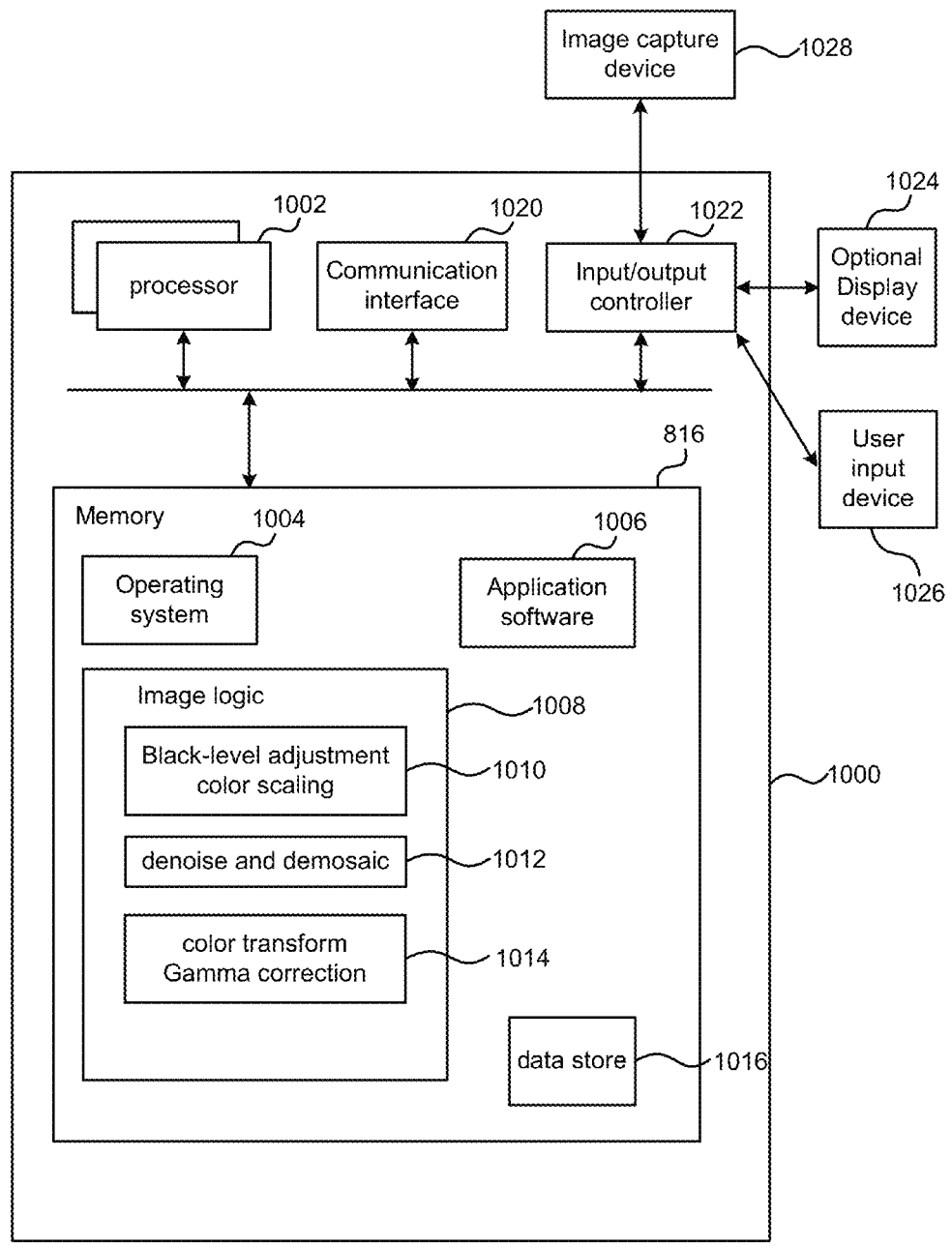
FIG. 10 illustrates an exemplary computing-based device in which embodiments of image demosaicing may be implemented.

FIG. 10 illustrates various components of an exemplary computing-based device 1000 which may be implemented as any form of a computing and/or electronic device, and in which embodiments of any of the methods described herein may be implemented.

Computing-based device 1000 comprises one or more processors 1002 which may be microprocessors, controllers or any other suitable type of processors for processing computer executable instructions to control the operation of the device in order to do any of: compute a demosaiced image from a mosaiced image, compute a demosaiced and denoised image from a noisy mosaiced image, train a machine learning system to compute a demosaiced image from a mosaiced image, compute a demosaiced denoised image from a mosaiced image, compute training data by downscaling mosaiced linear light-space images. In some examples, for example where a system on a chip architecture is used, the processors 1002 may include one or more fixed function blocks (also referred to as accelerators) which implement a part of the methods described herein (rather than software or firmware). Platform software comprising an operating system 1004 or any other suitable platform software may be provided at the computing-based device to enable application software 1006 to be executed on the device. In an example computing-based device 1000 may further comprise image logic 1008. Image logic 1008 may further comprise integrated black-level adjustment and color scaling logic 1010, integrated denoise and demosaic logic 1012, integrated color transform and Gamma correction logic 1014. In some examples the image logic 1008 is arranged to compute training data using the methods of all or part of FIGS. 6 and 7.

The computer executable instructions may be provided using any computer-readable media that is accessible by computing based device 1000. Computer-readable media may include, for example, computer storage media such as memory 1018 and communications media. Computer storage media, such as memory 1018, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1018) is shown within the computing-based device 1000 it will be appreciated that the storage may be distributed or located remotely and accessed via a network or other communication link (e.g. using communication interface 1018).

The computing-based device 1000 also comprises an input/output controller 1022 arranged to output display information to a display device 1024 which may be separate from or integral to the computing-based device 1000. The display information may provide a graphical user interface. The input/output controller 1022 is also arranged to receive and process input from one or more devices, such as a user input device 1026 (e.g. a mouse, keyboard, camera, microphone or other sensor) and image capture device 1028 (such as a digital color camera with a color filter array). In some examples the user input device 1026 may detect voice input, user gestures or other user actions and may provide a natural user interface (NUI). This user input may be used to generate depth maps as described above. In an embodiment the display device 1024 may also act as the user input device 1024 if it is a touch sensitive display device. The input/output controller 1022 may also output data to devices other than the display device, e.g. a locally connected printing device.

Any of the input/output controller 1022, display device 1024 and the user input device 1026 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of image demosaicing comprising:
receiving a digital mosaiced image;
calculating a demosaiced image from the received image using a trained machine learning system, the demosaiced image being in a linear light-space of a color image processing pipeline, the trained machine learning system having been trained using pairs of mosaiced and demosaiced images, at least one of the pairs comprising at least one of:
the mosaiced images having been formed by subsampling trained demosaiced images according to a color filter array pattern; or
the demosaiced images having been calculated from mosaiced images of a natural scene using a downscaling process; and
wherein a linear light-space is a stage of a color image processing pipeline at which a digital image has been linear color-scaled and black-level adjusted but at which a color transform and Gamma correction have not been applied to the digital image.

2. A method as claimed in claim 1 wherein the digital mosaiced image comprises a plurality of image elements each having a light intensity value for only one of three primary color channels, and wherein the demosaiced image comprises image elements having light intensity values for three primary color channels.

3. A method as claimed in claim 1 wherein the received digital mosaiced image is in the linear light-space.

4. A method as claimed in claim 1 wherein the trained machine learning system is one which has been trained using training demosaiced images having been formed by downscaling linear light-space mosaiced images of natural scenes.

5. A method as claimed in claim 1 wherein the trained machine learning system implements a discriminative model, being a model which seeks to describe a process of finding a demosaiced image which corresponds to a mosaiced image.

6. A method as claimed in claim 3 wherein the trained machine learning system is one which has been trained using pairs of mosaiced and demosaiced images, the mosaiced images having been formed by subsampling the trained demosaiced images according to a color filter array pattern.

7. A method as claimed in claim 4 the downscaling having comprised replacing blocks of image elements by aggregated values computed by weighting image elements according to their spatial position within a block.

8. A method as claimed in claim 4 the downscaling having comprised a weighted aggregation process over blocks of image elements, the weights having been selected to maximize entropy whilst also increasing towards a center of a block.

9. A method as claimed in claim 6 wherein the mosaiced images have had noise added to them.

10. A method as claimed in claim 9 wherein the noise has been added on the basis of an estimate of noise.

11. A method as claimed in claim 1 wherein the trained machine learning system comprises at least one regression tree field.

12. A method as claimed in claim 1 wherein the trained machine learning system comprises a plurality of regression tree fields arranged in a cascade architecture whereby at least some of the regression tree fields are connected in series.

13. A method as claimed in claim 1 at least party carried out using hardware logic.

14. One or more tangible hardware device-readable media with device-executable instructions comprising:
device-executable instructions to receive a digital mosaiced image comprising a plurality of image elements each having a light intensity value for only one of three primary color channels, the light intensity values having undergone only linear adjustments since output from an analog to digital converter; and
device-executable instructions to calculate a demosaiced image from the received image using a trained machine learning system, the demosaiced image comprising image elements having light intensity values for three primary color channels, the trained machine learning system having been trained using pairs of mosaiced and demosaiced images, at least one of the pairs comprising at least one of:
the mosaiced images having been formed by subsampling trained demosaiced images according to a color filter array pattern; or
the demosaiced images having been calculated from mosaiced images of a natural scene using a downscaling process.

15. An image demosaicing apparatus comprising:
a memory arranged to store a digital mosaiced image; and
a demosaicing logic arranged to calculate a demosaiced image from the received image using a trained machine learning system, the demosaiced image being in a linear light-space of a color image processing pipeline, the trained machine learning system having been trained using pairs of mosaiced and demosaiced images, at least one of the pairs comprising at least one of;
the mosaiced images having been formed by subsampling trained demosaiced images according to a color filter array pattern; or
the demosaiced images having been calculated from mosaiced images of a natural scene using a downscaling process; and
wherein a linear light-space is a stage of a color image processing pipeline at which a digital image has been linear color-scaled and black-level adjusted but at which a color transform and Gamma correction have not been applied to the digital image.

16. An apparatus as claimed in claim 15 wherein the trained machine learning system is one which has been trained using training demosaiced images having been formed by downscaling linear light-space mosaiced images of natural scenes.

17. An apparatus as claimed in claim 15 wherein the trained machine learning system implements a discriminative model, being a model which seeks to describe a process of finding a demosaiced image which corresponds to a mosaiced image.

18. An apparatus as claimed in claim 15 wherein the trained machine learning system is one which has been trained using pairs of mosaiced and demosaiced images, the mosaiced images having been formed by subsampling the trained demosaiced images according to a color filter array pattern.

19. An apparatus as claimed in claim 15 integral with a mobile camera phone.

20. An apparatus as claimed in claim 15 the demosaicing logic being at least partially implemented using hardware logic selected from any one or more of: a field-programmable gate array, a program-specific integrated circuit, a program-specific standard product, a system-on-a-chip, a complex programmable logic device, a graphics processing unit.

* * * * *